Patented June 13, 1944

2,350,982

UNITED STATES PATENT OFFICE 2,350,982

METHOD AND COMPOSITION OF GROWING PLANTS WITH SOLUTIONS

Theodore E. Borst, Clinton, N. Y., assignor to Samuel W. Meek, Greenwich, Conn.

No Drawing. Application October 15, 1940, Serial No. 361,237

12 Claims. (Cl. 71—1)

This invention relates to an improved technique for growing plants by means of a nutrient solution.

The growing of plants without using soil, known as hydroponics, has been known for a great many years, but has been practiced only by scientists or experts because of the practical difficulties involved in preparing and controlling the concentration of nutrient elements in the solutions used. Different plants require somewhat different solutions in order to produce the best growth, and after these solutions have been used for a given period of time they become deficient in some or all of the nutrient elements taken up by the plants.

To obtain good results, heretofore, it has always been considered necessary to prepare the nutrient solution initially with carefully measured and proportioned quantities of compounds of the different nutrient elements. After such a solution has been used for a period of time for the growing of one or more plants, it is necessary to determine by analysis or otherwise the extent of depletion of these nutrient elements in the solution and add sufficient quantities of compounds needed to make up this deficiency, or to discard the depleted solution and prepare a fresh solution of suitable strength.

It is generally recognized that such a control is essential in order to obtain sound plant growth. If the concentrations of one or more nutrient elements in the solution are too low for any substantial period of time, the plant may suffer seriously from deficiency of this element. On the other hand, plant growth may be retarded by the presence of too high a concentration of one or more of the nutrient elements, so that it is essential to use only very dilute solutions for feeding a plant.

It is an object of my invention to provide a method and means of preparing and controlling the effective ionic concentrations of nutrient elements in solutions for growing plants in a simple but effective manner.

A further object of this invention is to improve and simplify the technique of growing plants in liquid media by establishing and maintaining a chemical equilibrium between the nutrient elements in solution and an undissolved excess of compounds of these nutrient elements.

A further object of my invention is to provide mixtures of chemical compounds of nutrient elements that are sparingly soluble in water and that can be added to water in quantities exceeding their solubility to provide and maintain a nutrient solution of the proper strength for growing plants.

I have discovered that plants can be grown satisfactorily without soil by using a solution of nutrient elements that is maintained automatically at substantially constant strength by the presence of an undissolved excess of relatively insoluble compounds of these nutrient elements.

Various compounds that are relatively insoluble in water may be employed. For example, one convenient way of supplying metallic elements such as magnesium, aluminum, iron, manganese, copper, potassium, boron, molybdenum, zinc, titanium, nickel, cobalt, the alkaline earth metals and others is to add an excess of the silicates of these elements that are needed to water so that substantial quantities of the undissolved compounds of each element are in contact either intermittently or continuously with the solution. Either the relatively simple or the more complex silicates of these elements may be employed.

The elements such as calcium, strontium and barium may also be provided by using in a similar manner the sulfates, phosphates or carbonates of these elements. Nitrogen may be conveniently supplied by using any relatively insoluble compound thereof such as calcium ammonium phosphate.

At least one of the phosphates and one of the sulfates should be employed if suitable quantities of the necessary elements phosphorus and sulfur are to be supplied by means of sparingly soluble compounds. By using a sulfate of one or more of the alkaline earth elements, this alkaline earth element and sulfur are supplied simultaneously. Calcium ammonium phosphate may be used to supply calcium, nitrogen and phosphorus simultaneously in the same manner. If some other relatively insoluble nitrogen compound is employed, the phosphorus may be obtained by using one of the insoluble calcium phosphates such as dicalcium phosphate ($CaHPO_4$).

Instead of the inorganic calcium ammonium phosphate, nitrogen may be supplied by various insoluble compounds of urea or the like that hydrolyze or split in water to provide ammonia. For example, an insoluble salt may be prepared by reacting mono calcium phosphate and urea. This compound splits up again gradually in water, and under favorable pH conditions or in the presence of urease or other suitable enzymes, the urea liberated would be acted upon to give up ammonia and carbon dioxide.

In addition to the salts mentioned above, it is possible to use the relatively insoluble hydroxides, phosphates, or carbonates of the various metallic nutrient elements, as well as of other nutrient elements than those specifically mentioned. The ferric and cupric silicates, phosphates, carbonates or hydroxides are preferred to the ferrous and cuprous salts because of their lower solubility in water.

It is believed that the metallic silicates partially hydrolyze in the presence of water to form other metallic compounds which are sparingly soluble in water. By reason of the limited solubility of these compounds, an equilibrium is established between the effective concentration of metallic ions in solution, the concentration of undissolved products by hydrolysis and the unhydrolyzed silicates.

Mixtures of relatively insoluble compounds such as those discussed above usually provide a solution that is substantially neutral, with a pH of approximately 7. Different plants, however, may require a more acid medium for proper growth, or in some cases plants may require a slightly alkaline medium.

Various means such as buffering agents can be employed when needed to regulate and control the pH of the medium. By maintaining the pH at a constant value, the rate of hydrolysis of the compounds of the nutrient elements will be correspondingly controlled. I believe that this variation in the concentration of nutrient elements in solution with media of different pH is desirable and that plants requiring a somewhat acid media are the plants that require or assimilate the plant food from somewhat stronger solutions than those plants requiring a more neutral medium for growth. In any event, it is well recognized that the control of the pH of a solution in the art of hydroponics is just as essential to proper plant growth as is the correct acidity or pH of the soil when different plants are being grown in soil.

To control the pH of the nutrient solution, various types of buffering agents may be employed. For example, the addition of mono calcium phosphate alone to a dilute aqueous solution will give a pH of about 3, which is too acid for most plants. By mixing mono calcium phosphate with commercial slacked lime in proper proportions, however, and adding an excess of this mixture to this solution, the proper pH of the solution can be provided and maintained. Other calcium phosphates or mixtures of different calcium phosphates can probably be employed in a similar manner. Similarly, other mixtures of acidic and neutral or alkaline compounds that are relatively insoluble in water may be used.

A different type of buffer may be created by adding to the nutrient solution an excess of calcium carbonate, and by bubbling a controlled amount of carbon dioxide into the solution. By bubbling carbon dioxide into the solution in the absence of calcium carbonate, a pH of about 4 can be maintained, but in the presence of an excess of calcium carbonate, varying amounts of carbon dioxide can be used to produce and maintain a pH varying from 4 to 7. Other buffering agents to maintain a reasonably constant pH in the solution may, of course, be employed.

My invention is not limited to any particular technique of growing plants with solutions prepared and controlled according to this invention. Various methods have been employed and can be used. In any case, however, a certain amount of air must be supplied to the roots of the plant since oxygen is one of the essential elements for growing plants. One manner of supplying oxygen is to provide an arrangement for holding the roots or stem of the plant and maintaining around the lower portion of the roots of the plant the nutrient solution. This arrangement allows air to circulate around a portion of the plant roots and thus supply the needed oxygen. Another method that may be employed is to maintain the roots of the plant completely surrounded with the liquid nutrient medium that is agitated periodically or continuously and to bubble air through the liquid, thus supplying oxygen to the roots by aeration of the liquid medium.

A technique that I have employed successfully in accordance with this invention and that I prefer is to maintain the plant firmly held in one container and to provide a reservoir of nutrient solution in another container. Except when the plants are being fed, their roots are exposed to the air and the nutrient solution remains entirely in the reservoir. In this case, the excess of undissolved chemicals would form a sediment in the reservoir. By means of a pipe or tubing connecting the two containers, the nutrient solution may be pumped or otherwise caused to flow around the rooots of the plant from time to time. In this way the plant roots may be fed with the nutrient solution for a suitable period of time and the solution may then be drained back into the reservoir. As the solution drains back into the reservoir or is pumped back, it stirs up the sediment left in the reservoir and thus insures a constant equilibrium between the effective concentration of ions in solution and the undissolved compound. Satisfactory results have been obtained by this method, feeding plants for one-half hour at a time and from one to four times a day. Various other techniques of using a solution may, of course, be employed.

The solution strength may be maintained as indicated above by simply providing an undissolved excess of nutrient solids that remain suspended in or settle out as a sediment in the solution. Other ways of bringing the solution, or water, into contact with sparingly soluble nutrient solids, however, may be used. For example, the nutrient solids may be in the form of (1) a coating or lining that is porous or solid for a part or all of the interior of the apparatus containing the nutrient solution, (2) fixed or removable plates, diaphragms, or kindred devices suspended in the nutrient solution, (3) a plant root supporting means suitably fabricated in fibrous, porous, or alveolate form from vitreous or similar materials, or (4) a water conditioner or equilibrator connected by means of one or more conduits to the main apparatus and equipped with solid nutrient compounds in porous form through which water or solution may be passed from time to time to maintain the strength of one or more batches of solution.

If for any reason, it should be desirable to vary the concentration of one or more nutrient elements from time to time, soluble compounds of such elements could be added to the solution to augment the elements supplied according to this invention. Alternatively, an incomplete nutrient solution could be prepared with sparingly soluble compounds, and the remaining elements could, of course, be added as needed in the form of soluble compounds.

A solution that provides according to my invention an automatic control of the strength of even one nutrient element in solution is distinctly advantageous compared to the methods of controlling solution strengths that have been used heretofore.

By way of illustrating my invention, the following examples are given. It is to be understood, however, that the invention is not to be considered limited to these examples since the solutions may vary considerably for growing different flowers or vegetables, and relatively insoluble compounds other than those specified may, of course, be employed.

*Example I.*—A solution was prepared by placing in 5 liters of water 1 gram each of magnesium silicate, aluminum silicate, ferric silicate, cupric silicate, zinc silicate, calcium boro silicate and barium sulfate; 2 grams each of potassium aluminum silicate (orthoclase), strontium sulfate and calcium carbonate; 4 grams each of dicalcium phosphate ($CaHPO_4$) and calcium ammonium phosphate ($CaNH_4PO_4$); and 20 grams of calcium sulfate. These compounds were agitated and the solution allowed to stand until the undissolved excess of each compound settled out to form a sediment. This solution was kept in a reservoir at 18–20° C. and sufficient carbon dioxide was bubbled through the liquid to maintain a constant pH of about 4.5.

The particular quantities of the compounds given above are sufficient to provide a substantial excess of each compound beyond their limits of solubility. Somewhat smaller amounts of one or more of these compounds that exceed their solubility, or larger quantities of any of the compounds may, of course, be used.

From one to four times a day, a quantity of this solution was pumped into a tank in which gardenia plants were held so that their roots were completely immersed in the solution. The solution was allowed to remain around the plant roots for about 30 minutes at each feeding and then was drained back into the reservoir. As the liquid drained back into the reservoir, the sediment was stirred up and an effective equilibrium was thus maintained between the effective concentration of ions in solution and the undissolved compounds.

Other flowers or vegetables may be grown with such a solution in the same manner, due allowance being made for different pH requirements of different plants. For example, roses can be grown in a similar manner with this solution provided that somewhat less carbon dioxide is used in order to maintain a pH of about 5.5. Also, snapdragons could be grown using only a slight amount of carbon dioxide to maintain a pH of about 6–6.5.

*Example II.*—For growing plants such as carnations that require a substantially neutral medium, a solution may be prepared as described in Example I but omitting the calcium carbonate. This solution may then be used without any addition of carbon dioxide for growing carnation plants.

*Example III.*—Another solution may be prepared according to Example I but omitting the calcium carbonate. If a pH other than 7 is required, a suitable mixture of commercial slaked lime and monocalcium phosphate in an amount sufficient to provide an undissolved excess in the solution may be used. The relative proportions of these two compounds used will determine the pH of the solution, larger proportions of the acid phosphate being used to produce a lower pH.

The terms "sparingly soluble" or "relatively insoluble," used in the specification and claims, are used in the sense that these terms are used in connection with quantitative and qualitative analysis.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a method of growing a plant by means of a liquid nutrient medium, the step of feeding the plant with a solution in which the concentration of all essential nutrient elements dissolved in said medium is controlled by providing therein an undissolved excess of relatively insoluble compounds of said nutrient elements together with a buffering agent in such quantities that the pH of said medium is maintained substantially constant and the effective ionic concentration of said elements is controlled as long as said undissolved excess remains.

2. A method of growing a plant with an aqueous solution of nutrient elements comprising feeding the plant with such a solution and maintaining substantially constant the effective ionic concentrations of at least the principal plant nutrient elements by establishing and maintaining an equilibrium at a substantially constant pH between the elements in solution and undissolved relatively insoluble compounds of each of said elements.

3. A method of growing a plant as defined in claim 2 in which the ionic concentrations of iron and magnesium are maintained by providing an undissolved excess of iron and magnesium silicates in contact with the solution.

4. A method of growing a plant as defined in claim 2 in which the ionic concentrations of iron, magnesium, aluminum, potassium, boron and manganese are maintained by providing an undissolved excess of silicates of these elements in contact with the solution.

5. A method of growing a plant requiring an acid medium with an aqueous solution of nutrient elements supplied by an excess of relatively insoluble compounds thereof comprising feeding the plant with such a solution containing also a quantity of calcium carbonate in excess of its solubility, and controlling the pH of said solution by adding regulated quantities of carbon dioxide thereto.

6. A method of growing a plant with an aqueous solution of nutrient elements supplied by an excess of relatively insoluble compounds thereof comprising feeding the plant with such a solution containing also an undissolved excess of a mixture in predetermined proportions of lime and a slightly soluble acid calcium phosphate to control the pH of said solution.

7. A method as defined in claim 6 in which the phosphate is monocalcium phosphate.

8. A composition for preparing a nutrient solution for use in growing plants comprising a mixture of all essential relatively water insoluble compounds of nutrient elements required by growing plants, said compounds including a buffering agent for controlling the pH of such a solution.

9. A composition for preparing a nutrient solution for use in growing plants comprising a mixture of relatively water insoluble compounds of magnesium, iron, calcium, potassium, phosphorus, nitrogen, and sulfur, said compounds including a buffering agent for controlling the pH of such a solution.

10. A composition for preparing a nutrient solution for use in growing plants comprising a mixture of relatively water insoluble compounds of magnesium, iron, calcium, potassium, phosphorus, sulfur, nitrogen, manganese, boron, zinc and aluminum, said compounds including a buffering agent for controlling the pH of such a solution.

11. A composition for preparing a nutrient solution as defined in claim 10 which includes silicates of metallic nutrient elements required by growing plants, an alkaline earth metal sulphate, a relatively insoluble phosphate, and a relatively insoluble nitrogen compound.

12. A compound for preparing a nutrient solution for use in growing plants comprising a mixture of silicates of metallic nutrient elements required by growing plants, and a relatively insoluble buffering agent to control the pH of such a nutrient solution.

THEODORE E. BORST.

CERTIFICATE OF CORRECTION.

Patent No. 2,350,982.                                  June 13, 1944.

THEODORE E. BORST.

It is hereby certified that error appears in the printed specification of the above numbered patent requiring correction as follows: Page 3, second column, line 73, claim 8, before the word "relatively" strike out "all essential" and insert the same before "nutrient" in line 74, same claim; and that the said Letters Patent should be read with this correction therein that the same may conform to the record of the case in the Patent Office.

Signed and sealed this 29th day of August, A. D. 1944.

(Seal)                                        Leslie Frazer
                                             Acting Commissioner of Patents.